(12) United States Patent
Lee et al.

(10) Patent No.: US 11,162,775 B2
(45) Date of Patent: Nov. 2, 2021

(54) HOUSING SYSTEM FOR MICHELSON INTERFEROMETER

(71) Applicants: Jongmin Lee, Sejong-si (KR); Juno Lee, Daejeon (KR); Jaehwan Lee, Daejeon (KR); Hyowook Bae, Yongin-si (KR)

(72) Inventors: Jongmin Lee, Sejong-si (KR); Juno Lee, Daejeon (KR); Jaehwan Lee, Daejeon (KR); Hyowook Bae, Yongin-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 62 days.

(21) Appl. No.: 15/657,385

(22) Filed: Jul. 24, 2017

(65) Prior Publication Data

US 2018/0149465 A1  May 31, 2018

(30) Foreign Application Priority Data

Nov. 29, 2016 (KR) .......................... 10-2016-0160626

(51) Int. Cl.
*G01B 9/02* (2006.01)
*G01J 3/02* (2006.01)
(Continued)

(52) U.S. Cl.
CPC ........ *G01B 9/02051* (2013.01); *G01J 3/0202* (2013.01); *G01J 3/0286* (2013.01);
(Continued)

(58) Field of Classification Search
CPC ...... G01B 9/02051; G01J 3/0286; G01J 3/06; G01J 3/4535; G01J 3/0202; G01J 3/0208;
(Continued)

(56) References Cited

U.S. PATENT DOCUMENTS 4,652,130 A * 3/1987 Tank ....................... G01J 3/453
356/455
5,066,990 A  11/1991 Rippel
(Continued)

FOREIGN PATENT DOCUMENTS

JP  2014134534 A  7/2014
KR  20120097207 A  9/2012

OTHER PUBLICATIONS

Korean Office Action dated May 10, 2018, issued in corresponding Korean Patent Appln. No. 9-5-2018-031978575 with translation.

*Primary Examiner* — Violeta A Prieto
(74) *Attorney, Agent, or Firm* — Scully Scott Murphy and Presser

(57) ABSTRACT

The present invention relates to a housing of a Michelson interferometer that may facilitate optical alignment of a plurality of optical components by applying a two-part structured housing to the Michelson interferometer. The present invention may provide a Michelson interferometer housing system including a first housing including a first surface on which a fixed mirror is installed, a second surface perpendicular to the first surface, and a first diagonal surface on which a beam splitter assembly to which light is incident from the outside is installed, the first diagonal surface being formed at 45 degrees with respect to the second surface; and a second housing including a third surface on which a movable mirror is installed, a fourth surface perpendicular to the third surface, and a second diagonal surface corresponding to the first diagonal surface, wherein the first and second housings are combined such that the first and second diagonal surfaces face each other to allow the light entering from the outside to be divided through the beam splitter assembly and incident to the fixed mirror and the movable mirror.

6 Claims, 3 Drawing Sheets

(51) Int. Cl.
*G01J 3/453* (2006.01)
*G01J 3/06* (2006.01)
*G01N 21/35* (2014.01)

(52) U.S. Cl.
CPC .............. *G01J 3/0291* (2013.01); *G01J 3/06* (2013.01); *G01J 3/4532* (2013.01); *G01J 3/4535* (2013.01); *G01N 21/35* (2013.01); *G01N 2021/3595* (2013.01)

(58) Field of Classification Search
CPC .......... G01J 3/0291; G01J 3/45; G01J 3/4532; G02B 6/29349
See application file for complete search history.

(56) References Cited

U.S. PATENT DOCUMENTS

| | | | | |
|---|---|---|---|---|
| 5,305,088 | A * | 4/1994 | Hosoe | G01B 9/02019 356/487 |
| 7,630,081 | B2 * | 12/2009 | Ressler | G01J 3/02 356/451 |
| 9,377,600 | B2 * | 6/2016 | Vishnia | G02B 7/182 |
| 9,798,051 | B2 * | 10/2017 | Bleier | G02B 7/006 |
| 2002/0180981 | A1 * | 12/2002 | Ducellier | G02B 6/29358 356/491 |
| 2008/0170231 | A1 | 7/2008 | Ressler et al. | |
| 2010/0188728 | A1 * | 7/2010 | Warashina | B81B 7/0067 359/290 |
| 2011/0063728 | A1 * | 3/2011 | Cai | G02B 27/283 359/484.09 |
| 2012/0044565 | A1 * | 2/2012 | Wang | G02B 27/283 359/325 |
| 2016/0320176 | A1 * | 11/2016 | Yang | G01M 11/081 |
| 2018/0106590 | A1 * | 4/2018 | Ishigaki | G01B 9/02057 |
| 2019/0094016 | A1 * | 3/2019 | Ishigaki | G02B 27/283 |
| 2019/0178625 | A1 * | 6/2019 | Ishigaki | G01B 11/2545 |
| 2019/0310441 | A1 * | 10/2019 | Suchowski | G02B 7/18 |
| 2020/0208959 | A1 * | 7/2020 | Lee | G01B 9/02091 |
| 2020/0271434 | A1 * | 8/2020 | Ishigaki | G01B 9/021 |

\* cited by examiner

HOUSING SYSTEM FOR MICHELSON INTERFEROMETER

CROSS-REFERENCE TO RELATED APPLICATION

Pursuant to 35 U.S.C. § 119(a), this application claims the benefit of earlier filing date and right of priority to Korean Application No. 10-2016-0160626, filed on Nov. 29, 2016, the contents of which is incorporated by reference herein in its entirety.

BACKGROUND OF THE INVENTION

1. Field of the Invention

The present invention relates to a housing structure of the Michelson interferometer applied to a Fourier transform infrared spectrometer (FTIR), and more particularly, to a housing of the Michelson interferometer that may facilitate optical alignment of a plurality of optical components by applying a two-part structured housing to the Michelson interferometer.

2. Background of the Invention

An infrared spectrophotometer has various types such as a filter type, a dispersive type, and a Fourier Transform type depending on a device structure. The dispersive type and the filter type have a problem in which light reaching a detector is weak. Thus, most infrared spectrophotometers that are commercially available are Fourier transform infrared spectrometers (FTIRs).

Typically, the Michelson interferometer is used as the Fourier transform infrared spectrometers (FTIRs).

The Michelson interferometer is an apparatus for viewing a light interference pattern in physics. A light interference pattern appears when light is split into two beams through a beam splitter and then combined. Also, a light interference pattern appears due to an optical phase difference caused when two paths through which split light beams pass have different lengths and a refractive Index difference caused when light passes through different materials. It is possible to acquire an interference signal by measuring the light interference pattern with a detector.

In more detail, when light originates from a light source and reaches a detector through a beam splitter, the light travels along two paths. In this case, constructive interference occurs and thus a strong interference signal is detected when the length difference between the two paths is an integer multiple, whereas destructive interference occurs and thus a weak interference signal is detected when the length difference is a half-integer multiple.

The Michelson interferometer has multiple optical components such as a beam splitter assembly, a fixed mirror assembly, a movable mirror assembly, and a lens assembly. These components should be accurately placed at respective pre-calculated positions. That is, the Michelson interferometer is an optical device that is very sensitive to assembling and arrangement of the optical components.

However, a conventional housing structure that has been applied to the Michelson interferometer, which is a hexahedral one-body structure, has disadvantages in that a separate support fixture is needed to place the optical components constituting the Michelson interferometer, i.e., the beam splitter assembly, the fixed mirror assembly, the movable mirror assembly, and the lens assembly and also considerable time and cost are required to assemble and arrange the optical components because many arrangement factors should be considered during optical arrangement of the interferometer.

In particular, the conventional housing structure of the Michelson interferometer has a limitation in that optical arrangement of the optical components becomes complex when the Michelson interferometer is generally miniaturized.

SUMMARY OF THE INVENTION

Therefore, an aspect of the detailed description is to provide a two-part structured housing of a Michelson interferometer that may facilitate optical alignment of a plurality of optical components.

Another aspect of the detailed description is to provide a two-part structured housing of a Michelson interferometer that may increase resistance against external vibration or shock.

An embodiment of the present invention includes a Michelson interferometer housing system including a first housing including a first surface on which a fixed mirror is installed, a second surface perpendicular to the first surface, and a first diagonal surface on which a beam splitter assembly to which light is incident from the outside is installed, the first diagonal surface being disposed 45 degrees from the second surface; and a second housing including a third surface on which a movable mirror is installed, a fourth surface perpendicular to the third surface, and a second diagonal surface corresponding to the first diagonal surface, wherein the first and second housings are combined such that the first and second diagonal surfaces face each other to allow the light entering from the outside to be divided through the beam splitter assembly and incident to the fixed mirror and the movable mirror.

In an embodiment, a lens assembly configured to collect the light incident to the movable mirror and the fixed mirror may be installed on the fourth surface.

In an embodiment, the first and second housings may form respective internal spaces, and the first and second diagonal surfaces may include first and second openings for connecting the internal spaces of the first and second housings, respectively, so that some light originating from the beam splitter assembly is incident to the movable mirror and the other light is incident to the fixed mirror.

In an embodiment, the second surface may include a through-hole formed at a portion to allow the light to enter from the outside and also formed to face the movable mirror, and the beam splitter assembly may be installed on the first diagonal surface such that an angle with respect to the entering light is 45 degrees.

In an embodiment, the first housing may further include a fixing ring installed on the first diagonal surface to overlap the beam splitter assembly with respect to the first diagonal surface and configured to support the beam splitter assembly, and the second housing may further include a mounting groove recessed from the second diagonal surface and formed corresponding to the shape of the fixing ring so that the fixing ring is mounted thereon.

In an embodiment, the fixing ring may have the shape of a circular plate and may include a plurality of screw holes formed at one surface of the circular plate, and the first housing may further include a plurality of fixing screws inserted into the plurality of screw holes and configured to fix the fixing ring to the first diagonal surface.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
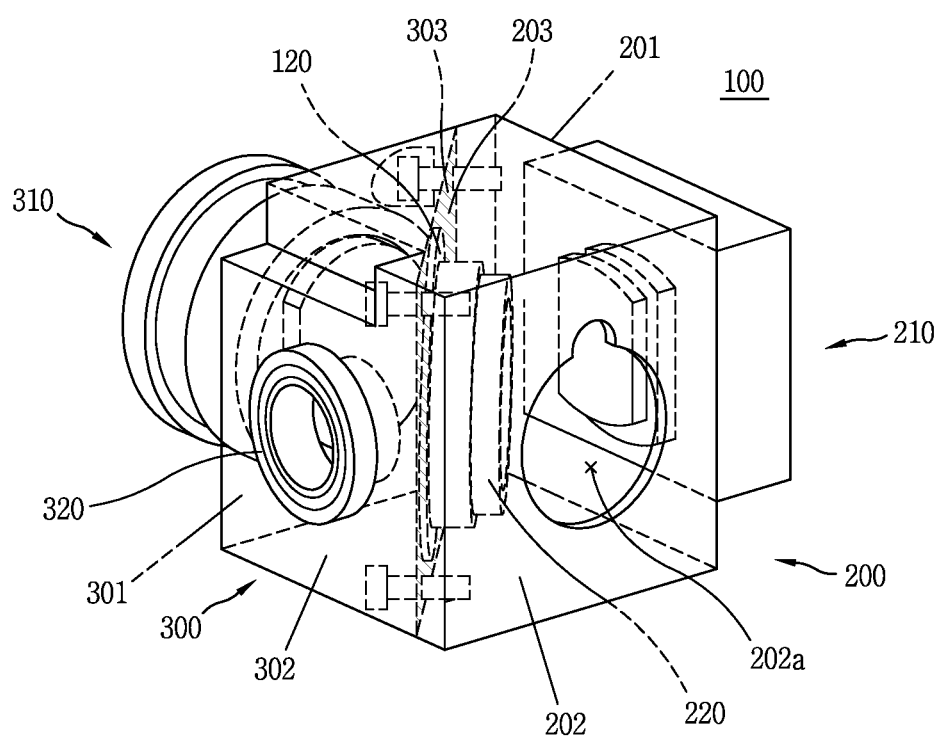
FIG. 1 is a reference view showing a Michelson interferometer housing system including first and second housings according to an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

As described above as the problems of the conventional technique, the conventional housing structure that has been applied to the Michelson interferometer, which is a hexahedral one-body structure, has disadvantages in that a separate support fixture is needed to place the optical components constituting the Michelson interferometer, i.e., the beam splitter assembly, the fixed mirror assembly, the movable mirror assembly, and the lens assembly and also considerable time and cost are required to assemble and arrange the optical components because many arrangement factors should be considered during optical arrangement of the interferometer.

The present invention proposes a Michelson interferometer housing system 100 including first and second housings 200 and 300 formed by diagonally dividing a hexahedral housing into two parts. Essential optical components are installed in the first and second housings 200 and 300.

FIG. 1 shows the Michelson interferometer housing system 100 in which a fixed mirror 210 and a beam splitter assembly 220 are installed in the first housing 200 formed by diagonally dividing a hexahedral housing and a movable mirror 310 and a lens assembly 320 are installed in the second housing 300.

The Michelson interferometer housing system 100 may include the first housing 200 and the second housing 300. The Michelson interferometer housing system 100 may implement a state in which the first and second housings 200 and 300 are combined with each other (hereinafter referred to as a first state) and a state in which the first and second housings 200 and 300 are separated from each other (hereinafter referred to as a second state).

FIG. 1 shows the first state in which the first and second housings 200 and 300 are combined with each other. Referring to FIG. 1, the first and second housings 200 and 300 in the first state may have the shape of a hexahedron. Also, the first and second housings 200 and 300 may be formed of titanium to strongly fix a plurality of optical components.

The first housing 200 may include a first surface 201 on which the fixed mirror 210 is installed, a second surface 202 perpendicular to the first surface 201, and a first diagonal surface 203 on which the beam splitter assembly 220 to which light is incident from the outside is installed. In this case, the first housing 200 may have the shape of a triangular prism.

Light entering from the outside corresponds to an infrared region. Here, the outside refers to any background corresponding to the outside of the housing system 100. That is, the outside may differ depending on a place where the housing system 100 is positioned.

The first surface 201 and the second surface 202 may be perpendicular to each other, and the first diagonal surface 203 may be formed at 45 degrees from the first and second surfaces 201 and 202. This is for allowing 50% of light divided through the beam splitter assembly 220 to be incident to the fixed mirror 210 and allowing the other 50% to be incident to the movable mirror 310 when the light is incident from the outside to the beam splitter assembly 220.

Also, the second surface 202 of the first housing 200 includes a through-hole 202a formed to face the movable mirror 310 to be described below and enable light to be incident from the outside to the beam splitter assembly 220.

As shown in FIG. 1, the through-hole 202a has no limitation in its size and shape as long as it can receive light from the outside. However, according to an embodiment of the present invention, the through-hole 202a has a circular shape and is formed at the center of the second surface 202.

When the through-hole 202a is formed at the center of the second surface 202, it is preferable that the beam splitter assembly 220 be installed at the center of the first diagonal surface 203. This is for allowing light entering the first housing 200 through the through-hole 202a to be incident to the beam splitter assembly 220 even when a separate component is not disposed in the Michelson interferometer housing system 100.

The second housing 300 may include a third surface 301 on which the movable mirror 310 is installed, a fourth surface 302 perpendicular to the third surface 301, and a second diagonal surface 303 formed corresponding to the first diagonal surface 203. In this case, the second housing 300 may have the shape of a triangular prism. Since the second diagonal surface 303 is formed corresponding to the first diagonal surface 203, the second diagonal surface 303 may be formed at 45 degrees with respect to the third and fourth surfaces 301 and 302.

A lens assembly 320 configured to collect light incident to each of the movable mirror 310 and the fixed mirror 210 so that the light may go out may be installed on the fourth surface 302.

The first and second housings 200 and 300 may be combined such that the first and second diagonal surfaces 203 and 303 face each other to allow light entering from the outside to be divisionally incident to the fixed mirror 210 and the movable mirror 310 through the beam splitter assembly 220. In this case, the Michelson interferometer housing system 100 may implement the first state.

A path along which light corresponding to an infrared region enters the Michelson interferometer housing system 100, in addition to the elements, will be described below with reference to FIG. 1.

The light corresponding to the infrared region enters the first housing 200 through the through-hole 202a and is incident to the beam splitter assembly 220 installed on the first housing 200 corresponding to the position of the through-hole 202a.

In this case, some of the light is transmitted to the beam splitter assembly 220, and the other is reflected from the beam splitter assembly 220. The transmitted light travels toward the movable mirror 310, and the reflected light travels toward the fixed mirror 210 and is incident to each of the movable mirror 310 and the fixed mirror 210. Ideally, the light incident to each of the movable mirror 310 and the fixed mirror 210 corresponds to an exact half of the light entering through the through-hole 202a.

Next, the light incident to the movable mirror 310 forms a fine path difference by movement of the movable mirror 310 and is reflected from the movable mirror 310 and incident to the beam splitter assembly 220 in a state different from the state in which the light is incident to the movable mirror 310.

On the other hand, since the fixed mirror 210 is fixedly installed in the first housing 200, the light incident to the fixed mirror 210 forms no path difference. Accordingly, the light is reflected from the fixed mirror 210 and incident to the beam splitter assembly 220 in a state identical to the state in which the light is incident to the fixed mirror 210.

Accordingly, the light incident to the beam splitter assembly 220 travels toward the lens assembly 320 and is collected by the lens assembly 320. The light collected by the lens assembly 320 is incident to a detector (not shown), and intrinsic properties of a material that emits the light can be found from the detector.

In order to implement the first state, the first and second housings 200 and 300 should be combined with each other. The combining method has no limitation. However, according to an embodiment of the present invention, when the first and second diagonal surfaces 203 and 303 are disposed facing each other and disposed in surface contact with each other, the first and second housings 200 and 300 are combined with each other by passing a plurality of screws 130 through the first and second diagonal surfaces 203 and 303.

When the screws 130 are separated from the first and second diagonal surfaces 203 and 303, the first and second diagonal surfaces 203 and 303 may be spaced apart from each other. Thus, it is possible to implement a second state in which the first and second housings 200 and 300 are separated from each other. As described above, it is possible to easily achieve the combination and separation of the first and second housings 200 and 300 and facilitate maintenance of the optical components.

Figure 2A:
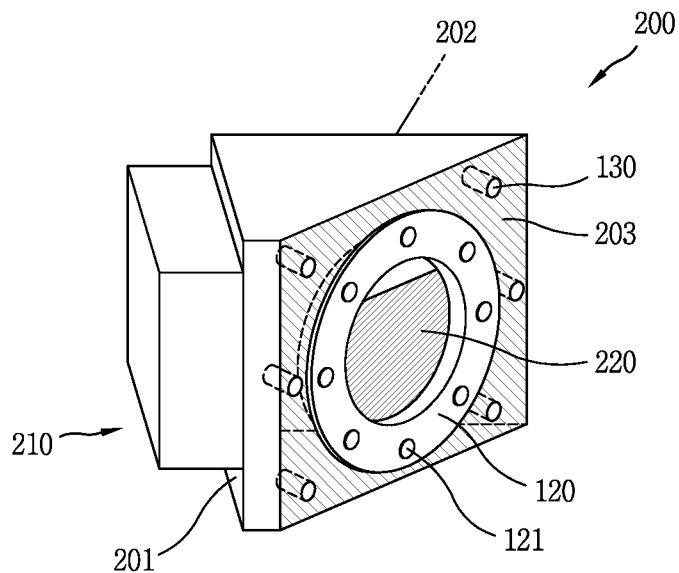
FIG. 2A is a detail view of the first housing structure in FIG. 1 according to an embodiment of the present invention.
Figure 2B:
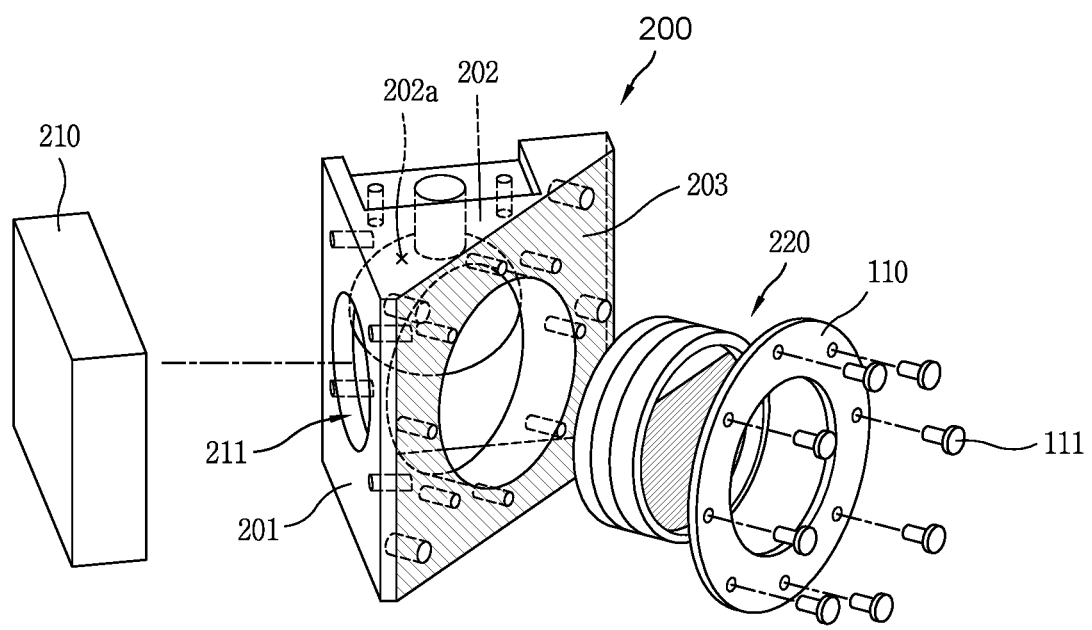
FIG. 2B is an exploded perspective view showing a state in which a plurality of optical components are separated from the first housing.

FIG. 2A is a detail view of the first housing structure of FIG. 1 according to an embodiment of the present invention, and FIG. 2B is an exploded perspective view showing a state in which a plurality of optical components are separated from the first housing.

Figure 3:
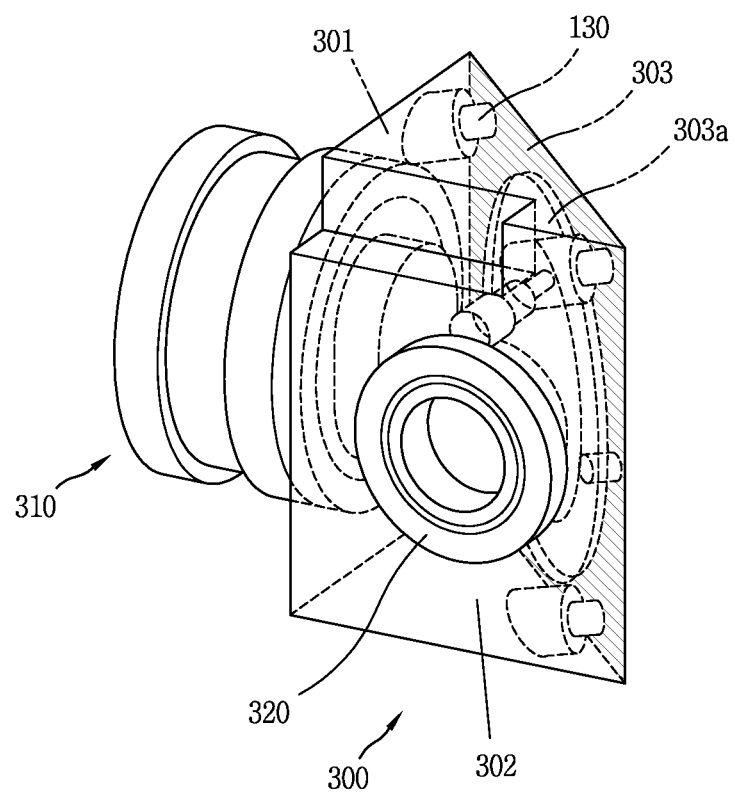
FIG. 3 is a detail view of the second housing structure in FIG. 1 according to an embodiment of the present invention.

FIG. 3 is a detail view of the second housing structure in FIG. 1 according to an embodiment of the present invention. FIGS. 2 and 3 show the second state in which the first and second housings 200 and 300 are separated from each other.

As shown in FIGS. 2 and 3, the first and second housings 200 and 300 may form respective internal spaces. The internal spaces of the first and second housings 200 and 300 may provide a light traveling and also may provide a space in which optical components or electronic components needed for the Michelson interferometer may be additionally disposed.

Generally, a Michelson interferometer system should have a separate support structure for supporting the beam splitter assembly 220. Thus, the conventional Michelson interferometer system has a difficulty in optically aligning optical components and also has a disadvantage in that it is sensitive to shock or vibration, e.g., the beam splitter assembly 220 is misaligned when shock or vibration is applied to the Michelson interferometer.

However, as shown in FIG. 2, according to the present invention, since the beam splitter assembly 220 is installed on the first housing 200 itself and fixedly combined therewith, it is possible to facilitate optical alignment of optical components, prevent the beam splitter assembly 220 from being misaligned in spite of external shock or vibration, and thus increase resistance against external shock or vibration.

Also, the fixed mirror 210 of the first housing 200 and the lens assembly 320 of the second housing 300 are disposed facing each other, and the movable mirror 310 is disposed between the fixed mirror 210 and the lens assembly 320.

That is, the present invention proposes a structure of the Michelson interferometer housing system 100 including the first housing 200 and the second housing 300 that are separated from and combined with each other through the first and second diagonal surfaces 203 and 303. By installing the fixed mirror 210 zo and the beam splitter assembly 220 among the optical components in the first housing 200 and combining the movable mirror 310 and the lens assembly 320 with the second housing 300, it is possible to facilitate alignment of a plurality of optical components applied to the Michelson interferometer by only combining the first housing 200 and the second housing 300.

Referring to FIGS. 2 and 3, the first and second diagonal surfaces 203 and 303 may include at least one first opening and at least one second opening formed to connect internal spaces of the first and second housings 200 and 300 with each other. Through the first and second openings, some of the light is incident to the movable mirror 310, and the other is incident to the fixed mirror 210.

Also, the beam splitter assembly 220 may have a smaller diameter than the first opening to pass through the first opening or may have a larger diameter than the first opening to partially overlap the first opening.

The beam splitter assembly 220 may be installed on the first diagonal surface 203 to partially overlap the first and second openings. Also, in the second state, the beam splitter assembly 220 may be at least partially exposed through the first opening.

Referring to FIGS. 2A and 2B, the first housing 200 may include a fixing ring 110 installed on the first diagonal surface 203 to at least partially cover the first opening and formed to fixedly support the beam splitter assembly 220.

The fixing ring 110 may be installed on the first diagonal surface 203 to overlap an edge of the beam splitter assembly 220. That is, the fixing ring 110 may be disposed to overlap the beam splitter assembly 220 with respect to the first diagonal surface 203.

Also, the fixing ring 110 may have the shape of a circular plate and include a plurality of screw holes 111a formed in one surface of the circular plate. The plurality of screw holes 111a may be formed along the periphery of the circular plate. The fixing ring 110 may have a hole formed corresponding to the first opening and may have the shape of a donut.

Also, the first housing 200 may further include a plurality of fixing screws 111b inserted into the plurality of screw holes 111a so that the fixing ring 110 may be fixed to the first diagonal surface 203.

That is, by inserting and fixing the plurality of fixing screws 111b through the plurality of screw holes 111a and the first diagonal surface 203, the fixing ring 110 may be installed on the first diagonal surface 203, and the fixing ring 110 may be configured to support the beam splitter assembly 220 at one side.

Referring to FIGS. 1 and 3, the second housing 300 may include a mounting groove 120 formed corresponding to the shape of the fixing ring 110 so that the fixing ring 110 may be mounted thereon. The mounting groove 120 may be recessed from the second diagonal surface 303. The fixing ring 110 may be mounted on the mounting groove 120 and fixedly supported by the first and second diagonal surfaces 203 and 303.

Referring to FIG. 3, as described above, according to the Michelson interferometer housing system 100, when the first and second diagonal surfaces 203 and 303 are disposed facing each other and disposed in surface contact with each other, the first and second housings 200 and 300 are combined with each other by passing a plurality of screws 130 through the first and second diagonal surfaces 203 and 303.

The plurality of screws 130 may be disposed through the remaining area of the second diagonal surface 303 other than an area in which the mounting groove 120 is formed. The plurality of screws 130 may pass through the remaining area of the second diagonal surface 303 and also may pass through the first diagonal surface 203.

When the plurality of screws 130 are fixed through both of the first and second diagonal surfaces 203 and 303, the first and second housings 200 and 300 may be combined with each other. Thus, it is possible to implement the first state.

Also, when the movable mirror 310 is installed on the third surface 301, the movable mirror 310 may be installed to protrude from the third surface 301 toward the outside of the second housing 300. Similarly, when the lens assembly 320 is installed on the fourth surface 302, the lens assembly 320 may be installed to protrude from the fourth surface 302 toward the outside of the second housing 300.

Through this structure, the movable mirror 310 and the lens assembly 320 are not installed to protrude from the third surface 301 and the fourth surface 302 in the internal spaces formed by the first and second housings 200 and 300. Accordingly, the movable mirror 310 and the lens assembly 320 may not interfere in a traveling path of light incident from the outside.

The present invention can achieve the following effects by the above-described embodiments and a configuration, combination, and usage relationship to be described below.

The present invention can facilitate optical alignment of a plurality of optical components applied to the Michelson interferometer by including a first housing and a second housing that are obtained through division of a hexahedron in a diagonal direction and installing a plurality of optical components in the first housing and the second housing.

The present invention can enhance vibration resistance or shock resistance of a Michelson interferometer system by installing a beam splitter assembly in any one of the first and second housings and also can reduce a light incidence error caused by external shock or vibration because light can be received from the outside without needing to separately include a support fixture for supporting the beam splitter assembly.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A Michelson interferometer housing system comprising:
   a first housing including a first surface on which a fixed mirror is installed, a second surface perpendicular to the first surface, and a first diagonal surface including a first opening at which a beam splitter assembly to which light is incident from the outside is installed, the first diagonal surface being formed at 45 degrees with respect to the second surface, the beam splitter assembly being supported by the first diagonal surface; and
   a second housing including a third surface on which a movable mirror is installed, a fourth surface perpendicular to the third surface, and a second diagonal surface corresponding to the first diagonal surface,
   wherein the first housing has a shape of a triangular prism having the first surface, the second surface, and the first diagonal surface as side surfaces of the first housing, and the second housing has a shape of a triangular prism having the third surface, the fourth surface and the second diagonal surface as side surfaces of the second housing;

wherein the first and second housings are combined such that the first and second diagonal surfaces face each other to allow the light entering from the outside to be divided through the beam splitter assembly and incident to the fixed mirror and the movable mirror, and wherein the beam splitter assembly has a smaller diameter than the first opening, or the beam splitter assembly has a lager diameter than the first opening.

2. The Michelson interferometer housing system of claim 1, wherein:

the second surface includes a through-hole formed at a portion to allow the light to enter from the outside and also formed to face the movable mirror; and the beam splitter assembly is installed on the first diagonal surface such that an angle with respect to the entering light is 45 degrees.

3. The Michelson interferometer housing system of claim 1, wherein a lens assembly configured to collect the light incident to the movable mirror and the fixed mirror is installed on the fourth surface.

4. The Michelson interferometer housing system of claim 2, wherein:

the first and second housings form respective internal spaces; and the second diagonal surface includes a second opening, wherein the first and second housings are connected to each other through the first and second openings respectively, so that some light originating from the beam splitter assembly is incident to the movable mirror and the other light is incident to the fixed mirror.

5. The Michelson interferometer housing system of claim 1, wherein:

the first housing further includes a fixing ring installed on the first diagonal surface to overlap the beam splitter assembly with respect to the first diagonal surface and configured to support the beam splitter assembly; and the second housing further includes a mounting groove recessed from the second diagonal surface and formed corresponding to the shape of the fixing ring so that the fixing ring is mounted thereon.

6. The Michelson interferometer housing system of claim 5, wherein:

the fixing ring has the shape of a circular plate and includes a plurality of screw holes formed at one surface of the circular plate; and the first housing further includes a plurality of fixing screws inserted into the plurality of screw holes and configured to fix the fixing ring to the first diagonal surface.

* * * * *